United States Patent
Khotimsky et al.

(10) Patent No.: US 11,523,194 B2
(45) Date of Patent: *Dec. 6, 2022

(54) SYSTEMS AND METHODS FOR MEASUREMENT OF OPTICAL PARAMETERS IN AN OPTICAL NETWORK

(71) Applicant: Verizon Patent and Licensing Inc., Basking Ridge, NJ (US)

(72) Inventors: Denis A. Khotimsky, Westborough, MA (US); Wenjia Wang, Westborough, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,980

(22) Filed: Oct. 26, 2021

(65) Prior Publication Data
US 2022/0046342 A1    Feb. 10, 2022

Related U.S. Application Data

(63) Continuation of application No. 16/817,848, filed on Mar. 13, 2020, now Pat. No. 11,184,692.

(51) Int. Cl.
*H04B 10/07* (2013.01)
*H04Q 11/00* (2006.01)
(Continued)

(52) U.S. Cl.
CPC ..... *H04Q 11/0067* (2013.01); *H04Q 11/0005* (2013.01); *H04B 10/07* (2013.01);
(Continued)

(58) Field of Classification Search
CPC ........... H04Q 11/0067; H04Q 11/0005; H04Q 11/0066; H04Q 2011/0079;
(Continued)

(56) References Cited

U.S. PATENT DOCUMENTS 6,396,575 B1    5/2002   Holland
6,963,696 B1 *  11/2005  Bowler .................. H04B 10/66
                                                          398/202
(Continued)

*Primary Examiner* — Dibson J Sanchez

(57) ABSTRACT

A method includes determining a first power level by performing a first series of measurements based on a first series of burst transmissions from an optical transmitter of an optical network unit (ONU) in an optical network. Bursts in the first series of burst transmissions include a first modified preamble. A second power level is determined by performing a second series of measurements based on a second series of optical burst transmissions. Bursts in the second series of burst transmissions include a second modified preamble. A first power level ($P_0$) and a second power level ($P_1$) are determined based on the first power level and the second power level and one or more additional parameters associated with transmissions from the optical transmitter are determined based on $P_0$ and $P_1$. Based on the additional parameters, it is determined whether the optical transmitter complies with specifications of the optical network.

20 Claims, 7 Drawing Sheets

(51) Int. Cl.
*H04B 10/079* (2013.01)
*H04J 14/02* (2006.01)

(52) U.S. Cl.
CPC ...... *H04B 10/079* (2013.01); *H04B 10/07955* (2013.01); *H04J 14/0235* (2013.01); *H04J 14/0249* (2013.01); *H04Q 11/0066* (2013.01); *H04Q 2011/0079* (2013.01); *H04Q 2213/13038* (2013.01)

(58) Field of Classification Search
CPC . H04Q 2213/13038; H04Q 2011/0064; H04Q 2011/0083; H04B 10/07; H04B 10/079; H04B 10/07955; H04J 14/0235; H04J 14/0249
USPC .......................................... 398/9–38, 43–103
See application file for complete search history.

(56) References Cited

U.S. PATENT DOCUMENTS

| | | | |
|---|---|---|---|
| 7,187,861 B2 | 3/2007 | Ruchet | |
| 7,414,234 B1* | 8/2008 | Teeter | H03F 3/087 250/214 R |
| 8,861,953 B2* | 10/2014 | Ruchet | H04B 10/0795 398/9 |
| 10,979,141 B1 | 4/2021 | Smith et al. | |
| 2003/0067662 A1* | 4/2003 | Brewer | H04B 10/695 398/202 |
| 2007/0127923 A1* | 6/2007 | Dalton | H04Q 11/0067 398/71 |
| 2007/0201867 A1* | 8/2007 | DeLew | H04B 10/077 398/38 |
| 2008/0310861 A1* | 12/2008 | Wong | H04L 25/062 398/210 |
| 2011/0255866 A1* | 10/2011 | Van Veen | H04J 14/02 398/100 |
| 2017/0085318 A1 | 3/2017 | Ruchet et al. | |
| 2017/0201320 A1 | 7/2017 | Prause | |
| 2018/0076890 A1 | 3/2018 | Ruchet et al. | |
| 2018/0309518 A1* | 10/2018 | Gao | H04B 10/272 |
| 2018/0359028 A1* | 12/2018 | Katayama | H04B 10/07955 |
| 2021/0111792 A1* | 4/2021 | Smith | H04B 10/0775 |
| 2021/0111796 A1 | 4/2021 | Smith et al. | |

* cited by examiner

SYSTEMS AND METHODS FOR MEASUREMENT OF OPTICAL PARAMETERS IN AN OPTICAL NETWORK

RELATED APPLICATION

The patent application is a continuation of U.S. patent application Ser. No. 16/817,848 filed on Mar. 13, 2020, titled "SYSTEMS AND METHODS FOR MEASUREMENT OF OPTICAL PARAMETERS IN AN OPTICAL NETWORK," the disclosure of which is hereby incorporated by reference herein in its entirety.

BACKGROUND

A Passive Optical Network (PON) is an optical access network based on a point-to-multipoint (P2MP) optical fiber topology, called an optical distribution network (ODN) that uses fiber and passive components, such as splitters and combiners. A PON system uses the ODN to provide connectivity between a plurality of central nodes and a plurality of user nodes using bi-directional wavelength channels. Parameters of optical transmitters in the central nodes and user nodes must be measured in order to verify compliance with specifications of the PON system and to ensure that a high quality of service is provided to customers.

DETAILED DESCRIPTION OF PREFERRED EMBODIMENTS

Figure 1:
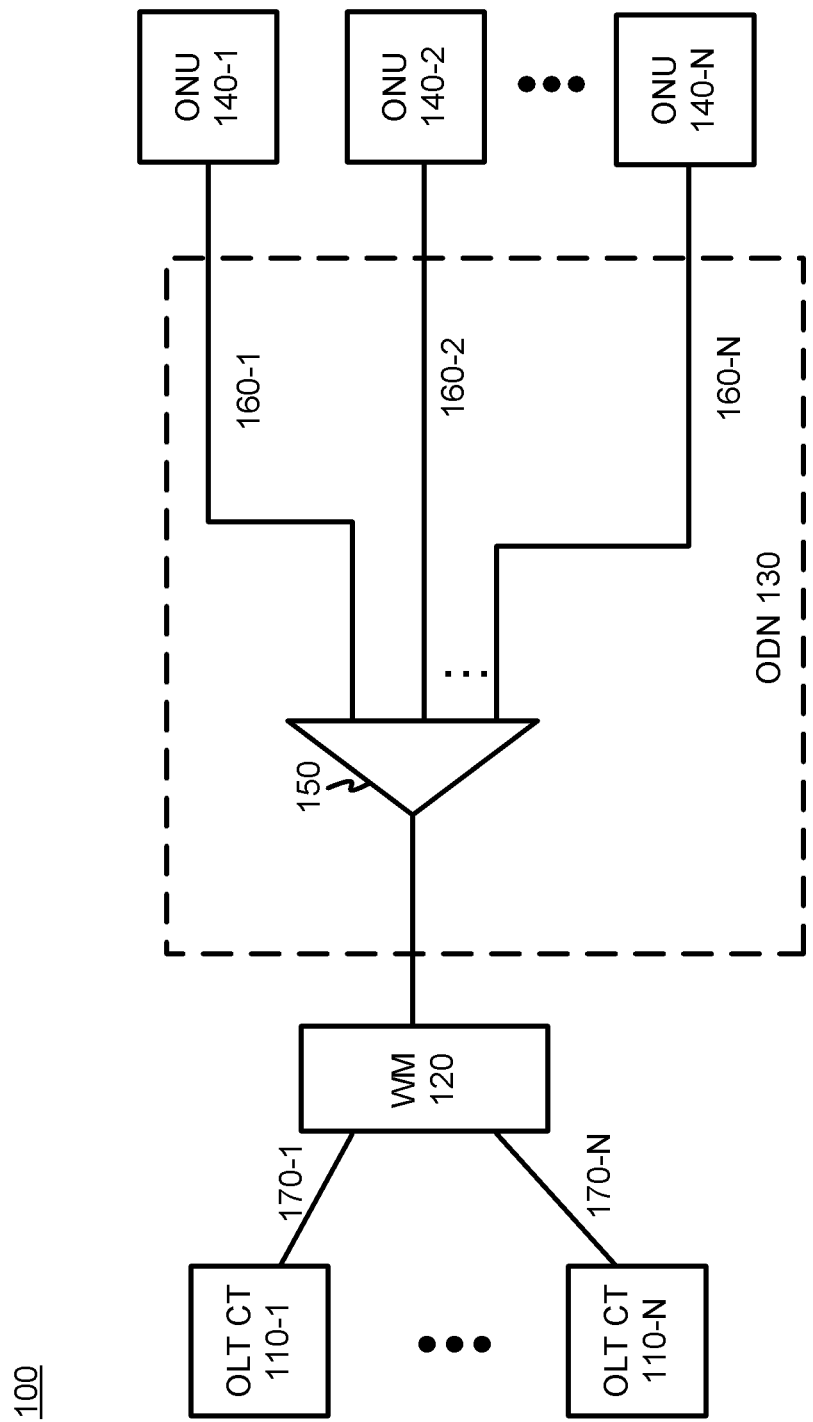
FIG. 1 illustrates an exemplary environment in which systems and methods described herein may be implemented.

The following detailed description refers to the accompanying drawings. The same reference numbers in different drawings may identify the same or similar elements.

An ODN may provide connectivity between a plurality of central nodes, known as optical line terminal network elements (OLTs), and plurality of user nodes, known as optical network units (ONUs) or optical network terminals (ONTs), using a plurality of bi-directional wavelength channels that each include a downstream wavelength and an upstream wavelength. In a conventional single-channel time-division multiplexed (TDM) PON system, each ONU may operate over a single fixed wavelength channel associated with a particular OLT channel termination (CT) over a single ODN.

In a time and wavelength division multiplexed (TWDM) PON system, an ONU may operate on a plurality of wavelength channels, one wavelength channel at a time. In a TWDM PON system, each wavelength channel may be associated with its own OLT CT and a plurality of wavelength channels may be multiplexed over a single ODN. The OLT CTs that form the same TWDM PON system may physically belong to the same module within a single OLT network element, to different modules within a single OLT network element, or to different OLT network elements. The plurality of ONUs in a TWDM PON system operating on a particular wavelength channel at any given time may follow the conventional TDM PON system, using the mechanisms of time-division multiplexing (TDM) in the direction from the OLT to the ONUs (the downstream transmission direction) and time-division multiple access (TDMA) in the direction from the ONU towards the OLT CT (the upstream transmission direction).

Each PON OLT CT and each PON ONU, which may collectively be referred to as PON network element (PON NEs), may contain an optical transmitter that converts the electrical signal into optical form and launches or forwards the resulting modulated optical signal into the optical fiber. An optical transmitter may be characterized by a plurality of parameters that define the ability of the transmitter to comply with a specification of a particular PON system. The optical transmitter parameters may include, for example, operation mode, optical power parameters, spectral parameters, temporal parameters, and other parameters. For each individual PON NE, the parameters may have to be verified to confirm compliance with the PON system specification. The parameter verification may be required in both laboratory and field environments.

Previously, measuring only the mean launch optical power ($P_{mean}$) of an optical transmitter was necessary in order to determine whether the optical transmitter was compliant with the specifications of a particular PON system. More recently, however, it has become necessary to take into account the extinction ratio of the optical transmitter in order to achieve high performance specifications. Extinction ratio (ER) is a ratio of two optical power levels—that of the high intensity of light, which usually corresponds to transmission of logical 1, denoted $P_1$, and that of the low intensity of light, which usually corresponds to transmission of logical 0, denoted $P_0$. As the overall requirements of the PON system increase, the optical transmitter specification may present a tradeoff between $P_{mean}$ and ER. For example, an optical transmitter may have slightly lower mean optical power and slightly higher extinction ratio in order to meet the specifications of the PON system. Likewise, an optical transmitter may have slightly higher mean optical power and slightly lower extinction ratio and meet the same specifications.

By building the PON system specifications in a dependent way, it may be possible to make more transmitters compliant and reduce the cost of the equipment. However, due to the complexities of the technology, it may be more difficult to measure the additional parameters and to evaluate the compliance of the transmitter with the specification of the PON system. For example, a technician in the field may easily be able to measure the mean optical power of a transmitter using a compact handheld instrument. However, in order to measure the additional parameters (ER, optical modulation amplitude (OMA), etc.) that are specified in relation to each other, the equipment that would normally be used may be prohibitively large/bulky and expensive.

Systems and methods described herein provide for determining parameters, such as extinction ratio and/or optical modulation amplitude that may be used in conjunction with mean optical power to specify a compliant transceiver. The mean optical power may be measured in the field using a compact instrument. The optical power parameters and the additional parameters are related by the following expressions:

$$P_{mean}=(P_0+P_1)/2; \quad \text{(Equ. 1)}$$

$$OMA=P_1-P_0; \quad \text{(Equ. 2)}$$

$$ER=P_1/P_0; \quad \text{(Equ. 3)}$$

$$OMA=2\,P_{mean}(ER-1)/(ER+1). \quad \text{(Equ. 4)}$$

The optical transmitter of a PON OLT may operate downstream in a continuous wave operation mode (CW mode), launching an uninterrupted modulated optical signal into the fiber. The optical transmitter of a PON ONU may operate in the burst mode (BM), remaining off or inactive most of the time and only launching a modulated optical signal into the fiber when instructed to do so by the OLT CT. The optical power parameters of the PON ONU optical transmitter may be specified and controlled only for the duration of an upstream transmission burst.

Direct application of Equations 1-4 above for calculation of extinction ratio ER and optical modulation amplitude OMA is only possible if expensive and bulky measurement equipment is used. System and methods described herein may allow the use of a compact instrument to obtain biased measurements of average burst optical power with unbalanced number of zeros and ones, having controlled measure of bias, to calculate the approximate values of the power levels of $P_0$ and $P_1$, and to calculate the approximate values of extinction ratio ER and optical modulation amplitude OMA.

FIG. 1 is a block diagram illustrating an exemplary environment 100 in which systems and methods described herein may be implemented. As shown in FIG. 1, environment 100 may include a plurality of OLT CTs 110-1 to 110-N (also referred to as OLT CTs 110, or individually or generally as OLT CT 110) connected to a wavelength multiplexer (WM) 120 via channel attachment fibers 170-1 to 170-N (also referred to as channel attachment fibers 170, or individually or generally as channel attachment fiber 170), an ODN 130, and a plurality of ONUs 140-1 to 140-N (also referred to as ONU 140, or individually or generally as ONU 140). ODN 130 may include a splitter 150 and a plurality of distribution fibers 160-1 to 160-N (also referred to as distribution fibers 160, or individually or generally as distribution fiber 160) to connect splitter 150 and ONUs 140.

OLT CTs 110 may correspond, for example, to optical blades or cards associated with optical signals carried via a PON, such as ODN 130, to ONUs 140. For example, OLT CTs 110 may be located in a central office (not depicted) that provides a connection service to ODN 130 for ONUs 140 located in customer premises (not depicted). The central office, for example, may provide television channels, streaming content, and/or other type of content from a video content delivery system. OLT CTs 110 may communicate with the customer premises via ODN 130 to provide data and/or services to the customer premises. Functions of OLT CTs 110 may be governed by one or more controllers (not depicted).

ONUs 140 may include devices to terminate distribution fibers 160 at customer premises. ONUs 140 may demultiplex incoming optical signals into component parts (such as voice telephone, television, and Internet), and provide the signals to user devices in customer premises. ONUs 140 may also transmit outgoing signals from devices in customer premises.

Each of OLT CTs 110 may be associated with a separate wavelength or range of wavelengths for sending downstream signals. Similarly, ONUs 140 may be associated with separate wavelengths or ranges of wavelengths for sending upstream signals. An optical transmitter (not depicted) at OLT CT 110 may operate in a continuous wave mode and an optical transmitter (not depicted) at ONU 140 may operate in a burst mode.

The different downstream wavelengths associated with OLT CTs 110 initially may be transmitted via channel attachment fibers 170s to WM 120. For example, as illustrated in FIG. 1, one channel attachment fiber 170-1 may carry a first wavelength channel and a separate channel attachment fiber 170-N may provide a different path for carrying a second wavelength channel. Channel attachment fibers 170 may be connected to WM 120, which may transmit the multiplexed wavelength channels into splitter 150. Splitter 150 may distribute the optical signal to ONUs 140 via distribution fibers 160.

Channel attachment fibers 170 and distribution fibers 160 may include, for example, fibers to transmit a corresponding wavelength and connectors to couple to devices (e.g., OLT CTs 110, WM 120, splitter 150, and ONUs 140). Channel attachment fibers 170 and distribution fibers 160 may include various other components not specifically described herein.

Still referring to FIG. 1, ODN 130 may include one or more additional components associated with a PON. For example, ODN 130 may include various passive optical components such as a filter, an attenuator, etc.

Although FIG. 1 illustrates exemplary components of environment 100, in other implementations, environment 100 may include fewer components, different components, differently arranged components, and/or additional components than those depicted in environment 100. Also, functions described as being performed by respective separate components of environment 100 may be performed by a single component, or a single function may be performed by multiple components of environment 100.

Furthermore, in FIG. 1, the depicted particular arrangement and number of components of environment 100 are illustrated for simplicity. In practice, there may be more or fewer OLT CTs 110, ONUs 140, and ODN 130 than depicted in FIG. 1. For example, there may be tens or even hundreds of OLT CTs 110 associated with a single central office.

Figure 2:
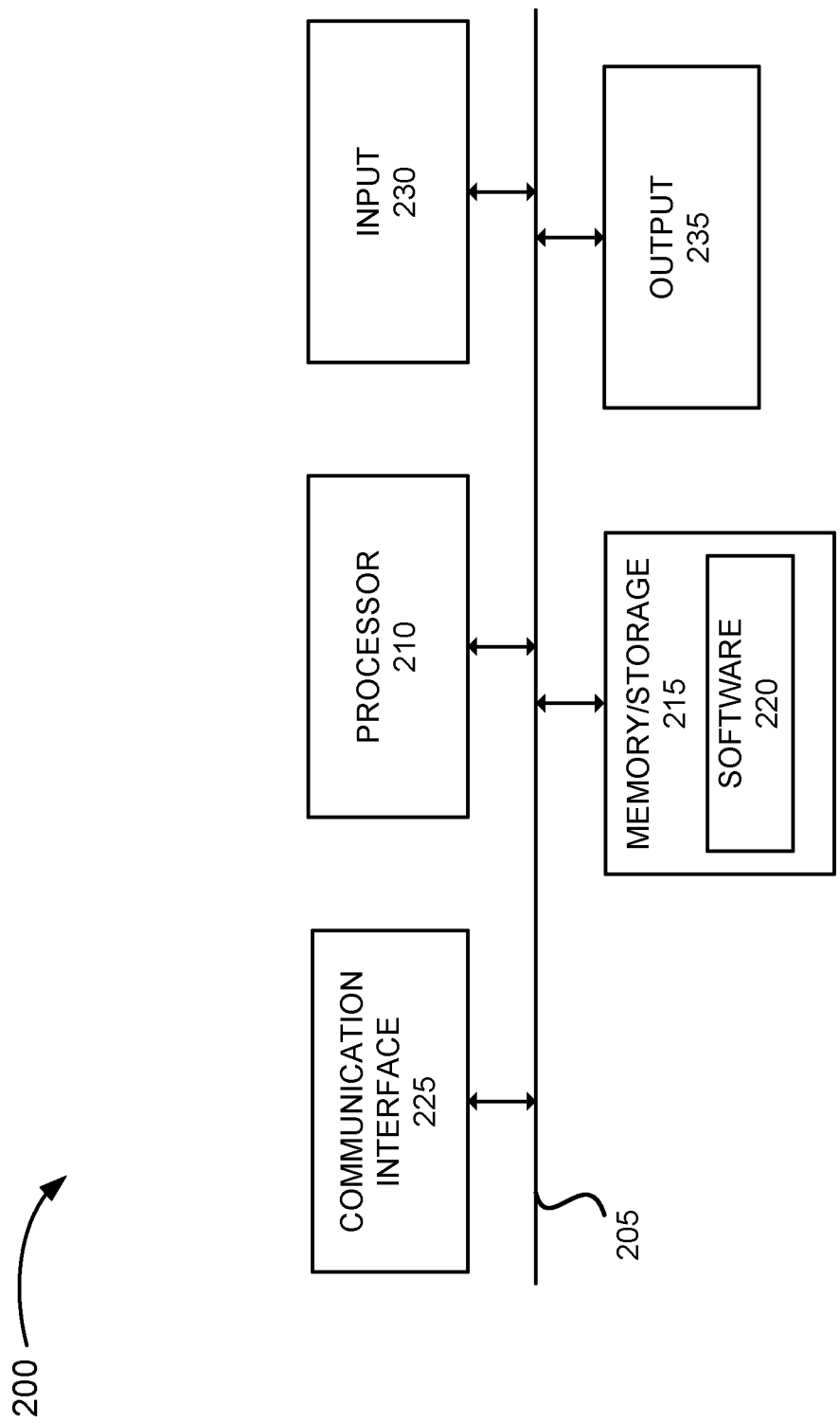
FIG. 2 illustrates exemplary components of a device that may be included in one or more of the devices described herein.

FIG. 2 is a diagram illustrating exemplary components of a device 200 that may be included in one or more of the devices described herein. For example, some or all of the components of device 200 may be included in OLT CT 110 and ONU 140. As illustrated in FIG. 2, device 200 includes a bus 205, a processor 210, a memory/storage 215 that stores software 220 and other data, a communication interface 225, an input 230, and an output 235. According to other embodiments, device 200 may include fewer components, additional components, different components, and/or a different arrangement of components than those illustrated in FIG. 2 and described herein. Additionally, or alternatively, according to other embodiments, multiple components may be combined into a single component. For example, processor 210, memory/storage 215, and communication interface 225 may be combined.

Bus 205 includes a path that permits communication among the components of device 200. For example, bus 205 may include a system bus, an address bus, a data bus, and/or a control bus. Bus 205 may also include bus drivers, bus arbiters, bus interfaces, clocks, and so forth.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc.

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include drives for reading from and writing to the storage medium.

Memory/storage 215 may be external to and/or removable from device 200, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may also include firmware, middleware, microcode, hardware description language (HDL), and/or other form of instruction. Software 220 may include an operating system.

Communication interface 225 permits device 200 to communicate with other devices, networks, systems, and/or the like. Communication interface 225 includes one or multiple optical interfaces. Communication interface 225 may include one or multiple wired and/or wireless interfaces. Communication interface 225 includes one or multiple transmitters and receivers, or transceivers. Communication interface 225 may operate according to a protocol stack and a communication standard. Communication interface 225 may include one or multiple line cards. For example, communication interface 225 may include processor 210, memory/storage 215, and software 220.

Input 230 permits an input into device 200. For example, input 230 may include a keyboard, a mouse, a display, a touchscreen, a touchless screen, a button, a switch, an input port, speech recognition logic, and/or some other type of visual, auditory, tactile, etc., input component. Output 235 permits an output from device 200. For example, output 235 may include a speaker, a display, a touchscreen, a touchless screen, a light, an output port, and/or some other type of visual, auditory, tactile, etc., output component.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
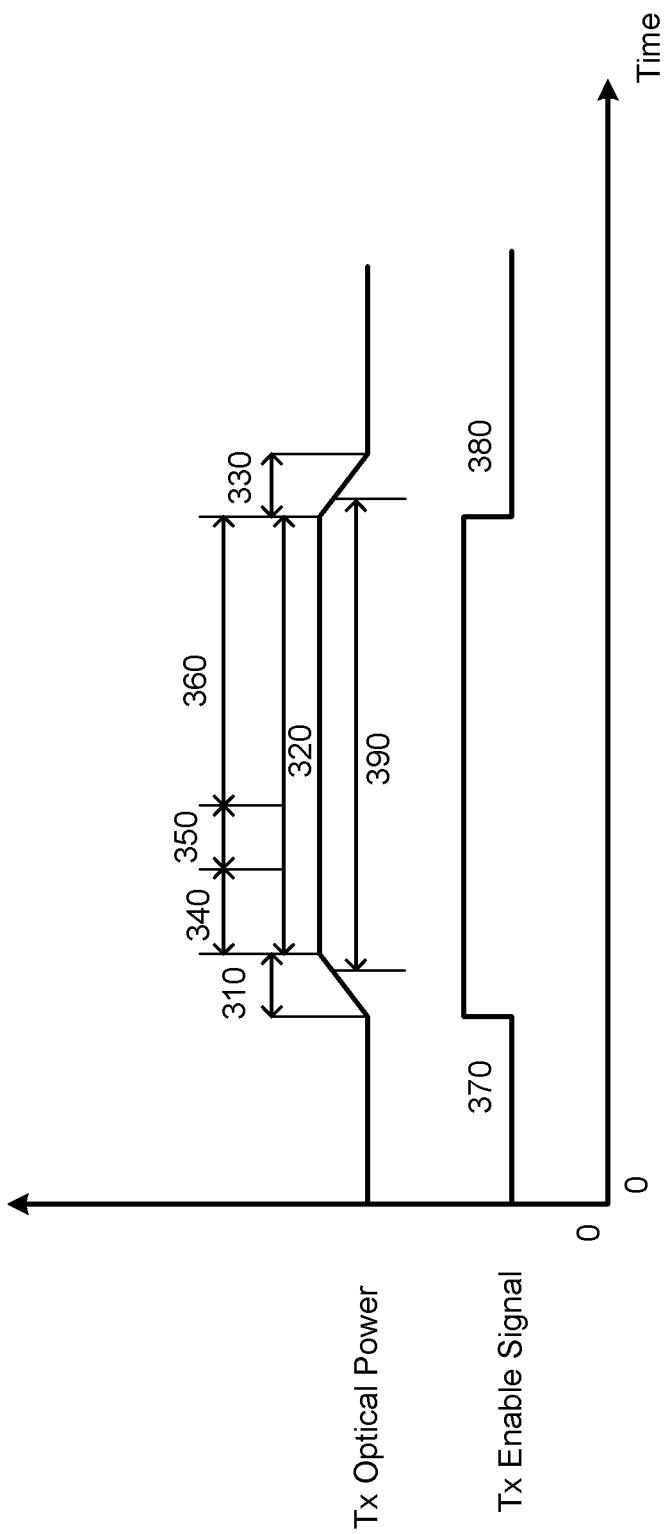
FIG. 3 illustrates a burst transmission according to an implementation.

FIG. 3 illustrates a burst that may be transmitted by ONU 140. The timing of an ONU burst may be controlled by the PON TDMA protocol. An optical transmitter of ONU 140 may normally be in an off or inactive state with an emitted Tx Optical Power at or close to zero. When ONU 140 transmits data, the timing of the transmission may be regulated by the rising edge 370 of a rectangular-shaped Tx Enable signal. As shown in FIG. 3, when the pulse of Tx Enable signal occurs, the optical transmitter may take a period of time, Enable Transient time 310, for the level of Tx Optical Power to reach an operational state and transmit burst 320, comprising a modulated optical signal. After burst 320 is transmitted, falling edge 380 of the rectangular-shaped Tx Enable Signal may cause the optical transmitter to stop transmitting burst 320 and return to the off or inactive state. As shown in FIG. 3, when falling edge 380 causes the optical transmitter to stop transmitting, Tx Optical Power may take a period of time, Disable Transient time 330, to return to zero (or close to zero).

The upstream transmission burst 320 may include a preamble 340, a delimiter 350, and a data section 360. Preamble 340 may allow a remote end optical receiver to achieve clock and data signal amplitude recovery. Delimiter 350 may allow the remote end optical receiver to delineate the start of the data transmission. Data section 360 may include a burst header and a burst payload.

When burst 320 occurs, a power meter may be applied to the burst mode optical signal and used to detect the start and the end of burst 320. A power meter may detect a plurality of bursts 320 over a period of time and may average the measured optical power over a plurality of burst intervals 390 detected during the period of time. The discrepancy between the average optical power of a BM optical signal measured by an optical power meter and the formally defined $P_{mean}$ gets smaller for a signal with a balanced number of zeros and ones and without long sequences of identical digits.

PON systems may provide the protocol-based facility for OLT CT 110 to control burst preamble 340 in terms of preamble pattern, preamble pattern length, and preamble pattern repeat count. Typically, the facility may be able to optimize the optical signal reception given a specific type and model of the OLT CT 110 and ONU 140 optical modules. In one embodiment, the facility may systematically create burst preambles 340 with an unbalanced number of zeros. In this way, biased measurements of average burst optical power may be obtained with a controlled measure of bias to calculate the approximate values of the power levels of $P_0$ and $P_1$ and to calculate the approximate values of ER and OMA using the expressions described above.

Figure 4:
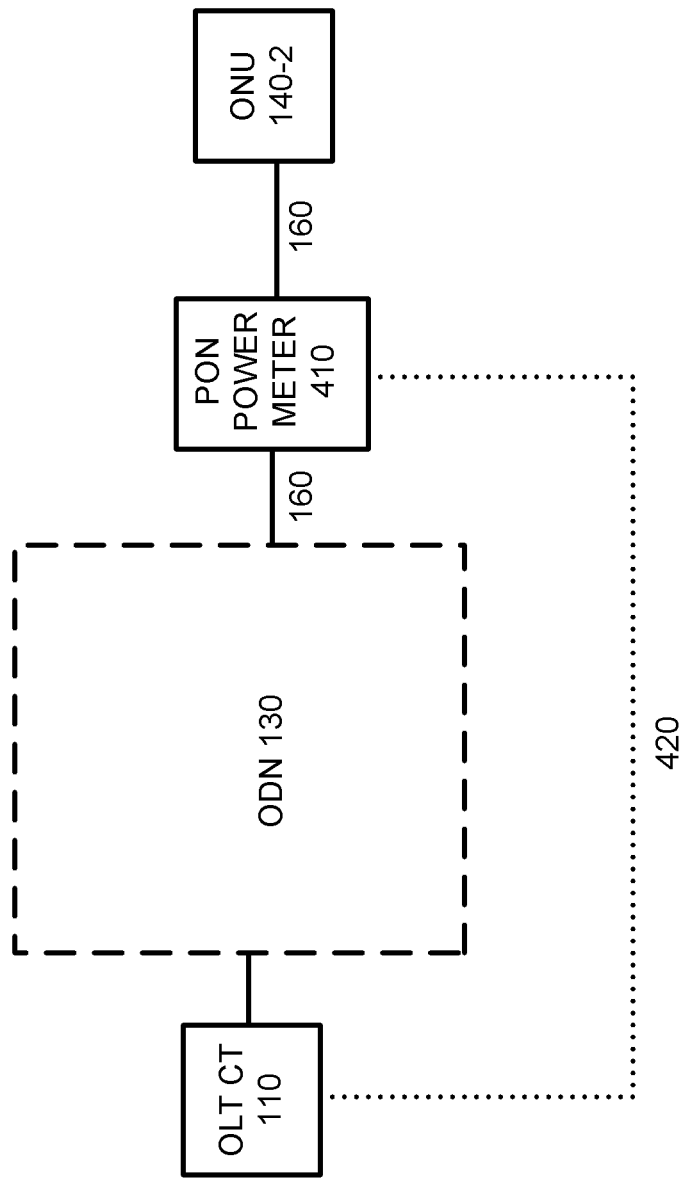
FIG. 4 illustrates an exemplary environment in which a power meter may be used to determine parameters associated with a burst transmission.

FIG. 4 is a diagram illustrating an exemplary environment 400 in which measurements may be taken to determine whether an optical transmitter is compliant with the specifications of a PON. Environment 400 may include OLT CT 110, ODN 130, ONU 140, distribution fiber 160, PON power meter 410, and communications channel 420.

As shown in FIG. 4, in order to perform measurements of the optical parameters of ONU 140, PON power meter 410 may be attached between ODN 130 and ONU 140 via distribution fiber 160. PON power meter 410 may be configured to receive and measure the optical power in a series of burst signals from ONU 140. For example, using a controlled burst preamble, PON power meter 410 may determine the average burst optical power of the series of burst signals and calculate the approximate values of additional parameters ($P_0$, $P_1$, ER, and/or OMA) associated with the bursts to determine the compliance of an optical transmitter associated with ONU 140 with specifications of the PON.

As shown in FIG. 4, communications channel 420 may be established between OLT CT 110 and PON power meter 410. In one embodiment, communications channel 420 may be established by setting up an out-of-band communications channel between a field technician at the same location as PON power meter 410 and an operator at a central office associated with OLT CT 110. For example, communications channel 420 may be established by establishing a cellular network phone call between the field technician at power meter 410 and the operator at OLT CT 110. In another implementation, communications channel 420 may comprise an automated out-of-band signaling channel, an in-band signaling channel via an activated ONU 140, or a different type of signaling channel.

Using communications channel 420, OLT CT 110 may negotiate a duration of a series of bursts during which a series of power measurements may be taken by PON power meter 410. In addition, using communications channel 420, OLT CT 110 may instruct ONU 140 to use a specified modified preamble and maintain the specified modified preamble during the duration of the series of measurement bursts. As described below in FIG. 5, based on the modified preamble, PON power meter 410 may obtain optical power measurements associated with ONU 140 and, based on the optical power measurements, may calculate the approximate values of the additional parameters associated with the burst transmission to determine a compliance of an optical transmitter associated with ONU 140 with specifications of the PON.

Figure 5:
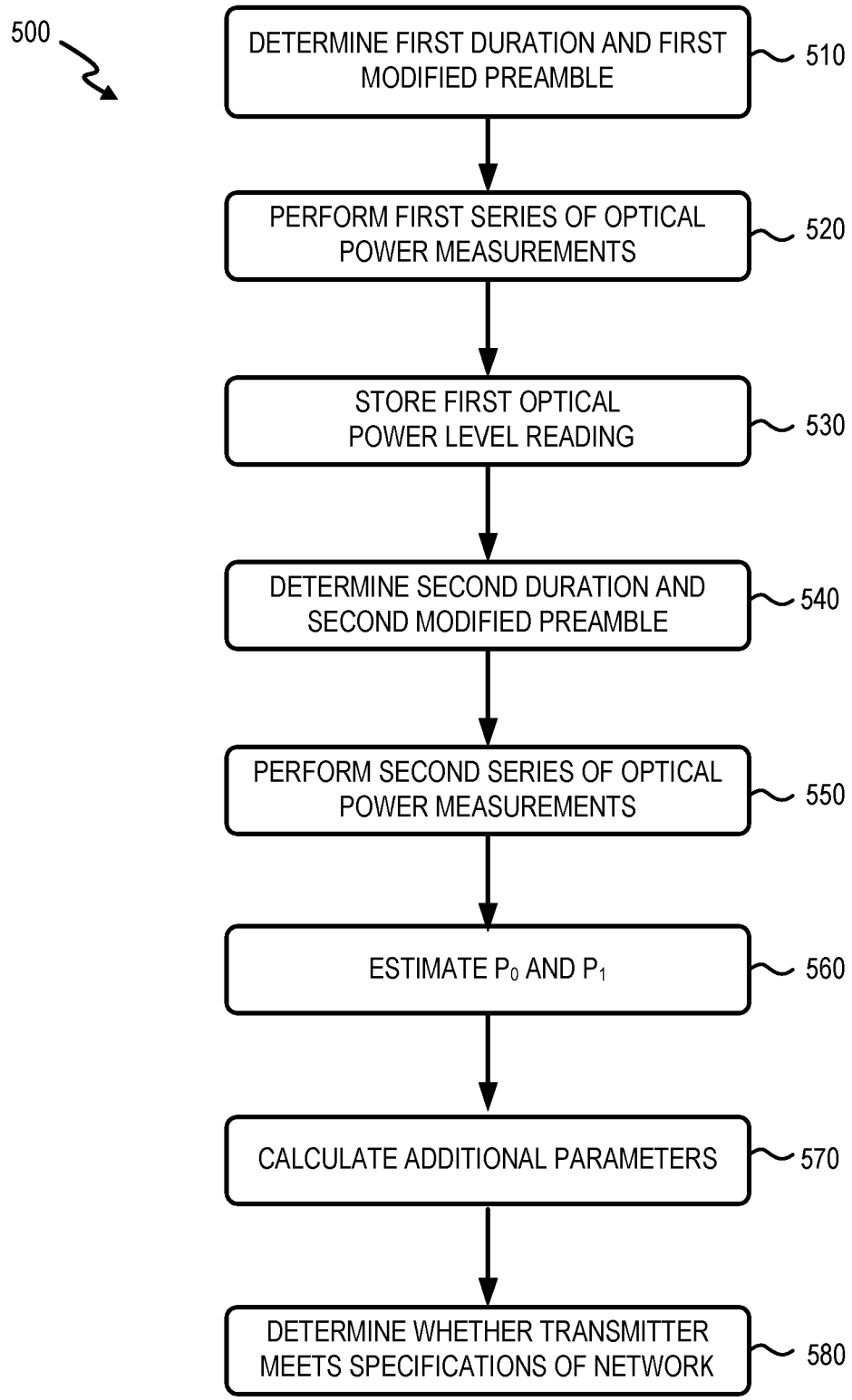
FIG. 5 is a flow diagram illustrating a process for evaluating whether a transmitter meets the specifications of a passive optical network.

FIG. 5 is a flow diagram illustrating a process 500 for evaluating whether a transmitter meets the specifications of a passive optical network. Process 500 may be performed using PON power meter 410.

Process 500 may begin by determining a first duration and a first modified preamble for performing a first series of optical power measurements (block 510). For example, a duration of a first measurement series may be negotiated between PON power meter 410 and OLT CT 110 over communications channel 420. In one implementation, the duration may indicate a number of bursts over which to perform optical power measurements. In another implementation, the duration may indicate a period of time over which to perform the optical power measurements. In addition, OLT CT 110 may instruct ONU 140 to use the first modified preamble and to maintain the first modified preamble for the entire duration of the first series of optical power measurement.

Process 500 may continue by using the first modified preamble to perform the first series of optical power measurements (block 520). In one implementation, an optical transmitter associated with ONU 140 may transmit a first series of bursts using the first modified preamble and PON power meter 410 may perform a series of optical power measurements over the specified duration. For example, PON power meter 410 may detect a series of bursts over the negotiated duration and may average the measured optical power over the burst intervals 390 detected during the duration to produce a first optical power level reading. Continuing with FIG. 5, once the first series of optical power measurements using the first modified preamble has been completed, the first optical power level reading may be stored (block 530).

Process 500 may continue by determining a second duration and a second modified preamble for performing a second series of optical power measurements (block 540). The second duration and the second modified preamble may be determined in a manner similar to the manner in which the first duration and the first modified preamble were determined. The second modified preamble may be used to perform the second series of optical power measurements over the second duration (block 550). The second series of optical power measurements may produce a second optical power level reading.

Process 500 may continue by performing calculations to determine the approximate values of $P_0$ and $P_1$ (block 560). For example, the first optical power level reading may be retrieved and used in conjunction with the second optical power level reading to solve a linear system of equations to obtain approximate values of power level $P_0$ and power level $P_1$. Examples of the linear systems of equations used to obtain approximate values of $P_0$ and $P_1$ are described below with respect to FIGS. 6 and 7.

When $P_0$ and $P_1$ have been determined, process 500 may continue by calculating additional parameters associated with the optical transmitter (block 570). In one implementation the optical modulation amplitude (OMA) and the extinction ratio (ER) for the transmitter may be calculated. For example, the optical modulation amplitude may be calculated using the expression $OMA=P_0-P_1$ and the extinction ratio may be calculated using the expression $ER=P_1/P_0$.

Figure 6:
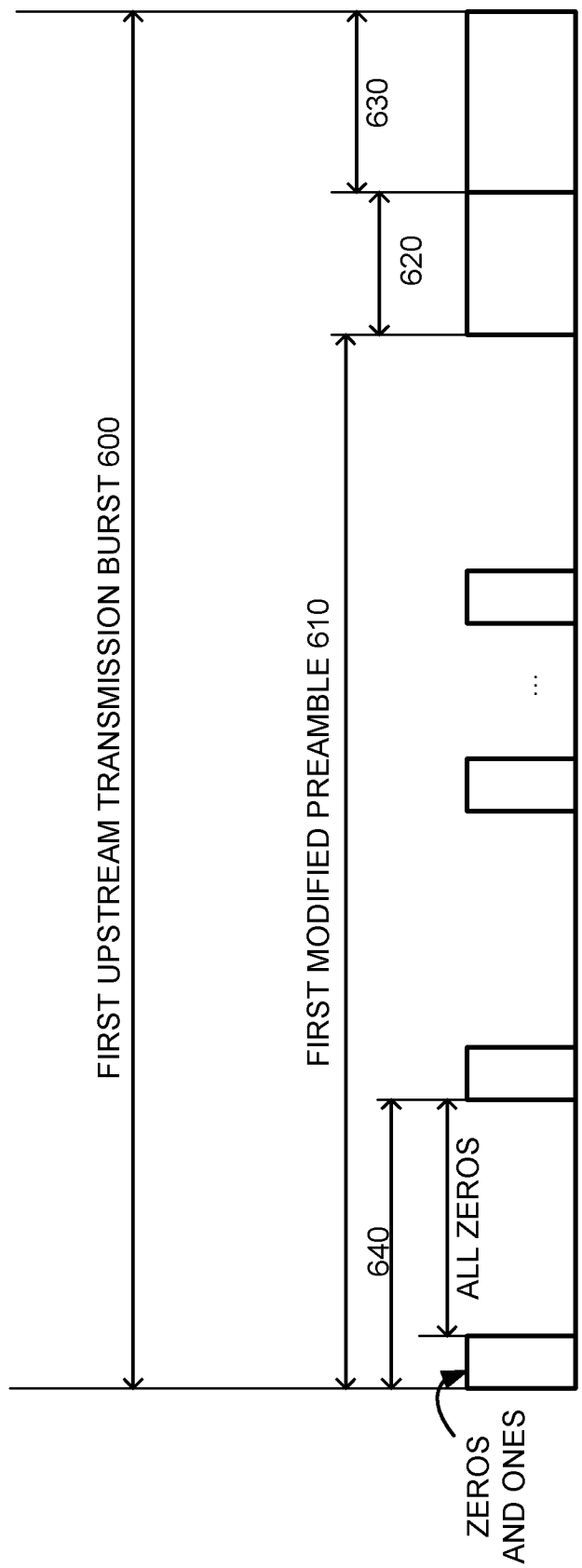
FIG. 6 illustrates an exemplary first burst using a modified first preamble.
Figure 7:
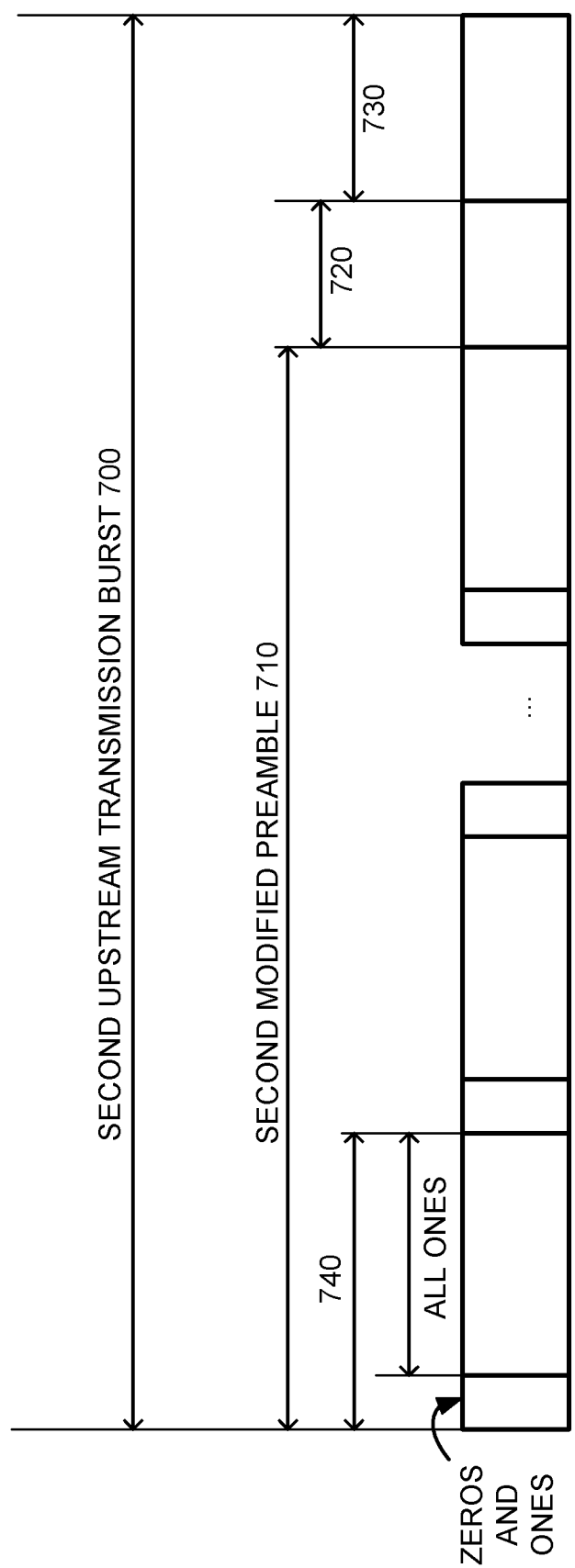
FIG. 7 illustrates an exemplary second burst using a modified second preamble.

Using the power levels, optical modulation amplitude, and/or the extinction ratio, it may be determined whether the transmitter meets the specifications of the passive optical network (block 580). In one implementation, the mean launch optical power and optical extinction ratio values that meet the specifications for the optical transmitter may form an envelope curve. Therefore, using PON power meter 410, a technician in the field may be able to validate the compliant level of the upstream mean launch optical power corresponding to the validated extinction ratio operating point on the envelope curve FIG. 6 illustrates an exemplary structure of a first upstream transmission burst 600 transmitted by a transmitter associated with ONU 140 using a first modified preamble. FIG. 7 illustrates an exemplary structure of a second upstream transmission burst 700 transmitted by the transmitter associated with ONU 140 using a second modified preamble. As shown in FIG. 6, first upstream transmission burst 600 may comprise a first modified preamble 610, a delimiter 620, a framing sublayer (FS) burst 630, and a first preamble pattern 640. As shown in FIG. 7, second upstream transmission burst 700 may include a second modified preamble 710, a delimiter 720, FS burst 730, and second preamble pattern 740.

A preamble of a regular burst typically may be balanced in terms of zeros and ones and comprise a high density of transitions. In contrast, first modified preamble 610 and second modified preamble 710 may be biased towards a single type of binary digit and may comprise the longest possible preamble pattern that ensures controlled runs of consecutive identical digits and a largest possible repeat count.

As shown in FIG. 6, first modified preamble 610 may use first preamble pattern 640, which is numerically equal to 0xA000 0000 0000 0000 and is composed of a first section of alternating zeros and ones and a second section of all zeros. The first preamble pattern is 8 octets long (the maximum preamble pattern length allowed under ITU-T Rec G.989.3), is heavily biased towards zeros, and is repeated 255 times (the maximum preamble pattern repeat count under ITU-T Rec G.989.3). As shown in FIG. 7, second modified preamble 710 may use second preamble pattern 740, which is numerically equal to 0xAFFF FFFF FFFF FFFF and is composed of a first section of alternating zeros and ones and a second section of all ones. The second preamble pattern is 8 octets long, is heavily biased towards ones, and is repeated 255 times.

Delimiters 620 and 720 may be chosen to use a standard recommended pattern to facilitate the OLT CT burst delineation. The standard delimiter pattern is 4 octets long and is balanced in terms of zeros and ones. FS bursts 630 and 730 may be of minimum possible size, comprising an FS header (4 octets), the minimum allocation of 4 octets (upstream buffer report), and an FS trailer (4 octets). Because FS bursts 630 and 730 may be scrambled before transmission, FS bursts 630 and 730 may be considered balanced in terms of zeros and ones.

The total lengths of burst 600 and burst 700 may be 8*255+16=2056 octets. Burst 600 may comprise 7*255=1785 all-zeros octets and 255+16=271 balanced octets. Burst 700 may comprise 7*255=1785 all-ones octets and 255+16=271 balanced octets.

If L1 denotes the power level reading obtained as a result of performing a first series of optical power measurements using first modified preamble 610, and L2 denotes the power level reading obtained as a result of performing a second series of optical power measurements using second modified preamble 710, then the power level reading may be expressed in terms of the power level $P_0$ and the power level $P_1$ as follows:

$$L1=1785/2056*P_0+271/2056*P_{mean};$$

$$L2=1785/2056*P_1+271/2056*P_{mean}.$$

From there, an approximate value of the OMA and ER may be obtained, respectively as:

$$OMA=P_1-P_0=2056/1785(L2-L1);$$

$$ER=P_1/P_0=(1920.5L2-135.5L1)/(1920.5L1-135.5L2).$$

Based on the calculations of OMA and/or ER, an operator may determine whether the optical transmitter meets the specifications required by the PON.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, and a series of signals with respect to FIGS. 6 and 7, the order of the blocks and/or signals may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
configuring a first burst preamble including a first repeating preamble pattern that is biased with respect to a first data bit value over a second data bit value, wherein the first repeating preamble pattern includes a first data signal that is balanced with respect to the first data bit value and the second data bit value;
performing a first series of measurements based on a first series of burst transmissions from an optical transmitter of an optical network unit (ONU) in an optical network, wherein first bursts in the first series of burst transmissions include the first burst preamble;
determining a first optical power level based on the first series of measurements;
configuring a second burst preamble including a second repeating preamble pattern that is biased with respect to the second data bit value over the first data bit value, wherein the second repeating preamble pattern includes a second data signal that is balanced with respect to the first data bit value and the second data bit value;
performing a second series of measurements based on a second series of burst transmissions from the optical transmitter, wherein second bursts in the second series of burst transmissions include the second burst preamble; and
determining a second optical power level based on the second series of measurements.

2. The method of claim 1, wherein the first repeating preamble pattern further comprises:
a third data signal that contains all logical zeros; and
wherein the second repeating preamble pattern further comprises:
a fourth data signal that contains all logical ones.

3. The method of claim 1, wherein configuring the first burst preamble comprises controlling the first repeating preamble pattern with respect to a first data bit pattern, a first length, and a first repeat count, and
wherein configuring the second burst preamble comprises controlling the second repeating preamble pattern with respect to a second data bit pattern, a second length, and a second repeat count.

4. The method of claim 3, wherein the first data bit pattern and the second data bit pattern correspond to a first section of alternating data bit values, and a second section of identical data bit values,
wherein the first length and the second length correspond to 8 octets, and
wherein the first repeat count and the second repeat count correspond to 255.

5. The method of claim 1, further comprising:
transmitting the first bursts upon a first transmission optical power level reaching a first operational state, and
transmitting the second bursts upon a second transmission optical power level reaching a second operational state.

6. The method of claim 1, further comprising:
calculating, based on a mathematical relationship between the first optical power level and the second optical power level, an extinction ratio (ER) for the optical transmitter; and
validating, based on the first optical power level, the second optical power level, and the ER, a compliance level associated with the optical transmitter with respect to specifications of the optical network.

7. The method of claim 1, further comprising:
calculating, based on a mathematical relationship between the first optical power level and the second optical power level, an optical modulation amplitude (OMA) for the optical transmitter; and
validating, based on the first optical power level, the second optical power level, and the OMA, a compliance level associated with the optical transmitter with respect to specifications of the optical network.

8. A system comprising:
an optical network unit (ONU) including an optical transmitter; and
a power meter configured to connect to the ONU, wherein the power meter is further configured to:
configure a first burst preamble including a first repeating preamble pattern that is biased with respect to a first data bit value over a second data bit value, wherein the first repeating preamble pattern includes a first data signal that is balanced with respect to the first data bit value and the second data bit value;
perform a first series of measurements based on a first series of burst transmissions from the optical transmitter of the ONU in an optical network, wherein first bursts in the first series of burst transmissions include the first burst preamble;
determine a first optical power level based on the first series of measurements;
configure a second burst preamble including a second repeating preamble pattern that is biased with respect to the second data bit value over the first data bit value, wherein the second repeating preamble pattern includes a second data signal that is balanced with respect to the first data bit value and the second data bit value;
perform a second series of measurements based on a second series of burst transmissions from the optical transmitter, wherein second bursts in the second series of burst transmissions include the second burst preamble; and
determine a second optical power level based on the second series of measurements.

9. The system of claim 8, wherein the first repeating preamble pattern further comprises:
a third data signal that contains all logical zeros; and
wherein the second repeating preamble pattern further comprises:
a fourth data signal that contains all logical ones.

10. The system of claim 8, wherein, when configuring the first burst preamble, the power meter is configured to:
control the first repeating preamble pattern with respect to a first data bit pattern, a first length, and a first repeat count, and
wherein, when configuring the second burst preamble, the power meter is configured to:
control the second repeating preamble pattern with respect to a second data bit pattern, a second length, and a second repeat count.

11. The system of claim 10, wherein the first data bit pattern and the second data bit pattern correspond to a first section of alternating data bit values, and a second section of identical data bit values,
wherein the first length and the second length correspond to 8 octets, and
wherein the first repeat count and the second repeat count correspond to 255.

12. The system of claim 8, wherein the power meter is further configured to:
  transmit the first bursts upon a first transmission optical power level reaching a first operational state, and
  transmit the second bursts upon a second transmission optical power level reaching a second operational state.

13. The system of claim 8, wherein the power meter is configured to:
  calculate, based on a mathematical relationship between the first optical power level and the second optical power level, an extinction ratio (ER) for the optical transmitter; and
  validate, based on the first optical power level, the second optical power level, and the ER, a compliance level associated with the optical transmitter with respect to specifications of the optical network.

14. The system of claim 8, wherein the power meter is further configured to:
  calculate, based on a mathematical relationship between the first optical power level and the second optical power level, an optical modulation amplitude (OMA) for the optical transmitter; and
  validate, based on the first optical power level, the second optical power level, and the OMA, a compliance level associated with the optical transmitter with respect to specifications of the optical network.

15. A non-transitory computer readable medium comprising instructions, the instructions comprising:
  one or more instructions that, when executed by a processor of a power meter configured to connect to an optical network unit (ONU), cause the power meter to:
    configure a first burst preamble including a first repeating preamble pattern that is biased with respect to a first data bit value over a second data bit value, wherein the first repeating preamble pattern includes a first data signal that is balanced with respect to the first data bit value and the second data bit value;
    perform a first series of measurements based on a first series of burst transmissions from an optical transmitter of the ONU in an optical network, wherein first bursts in the first series of burst transmissions include the first burst preamble;
    determine a first optical power level based on the first series of measurements;
    configure a second burst preamble including a second repeating preamble pattern that is biased with respect to the second data bit value over the first data bit value, wherein the second repeating preamble pattern includes a second data signal that is balanced with respect to the first data bit values and the second data bit values;
    perform a second series of measurements based on a second series of burst transmissions from the optical transmitter, wherein second bursts in the second series of burst transmissions include the second burst preamble; and
    determine a second optical power level based on the second series of measurements.

16. The non-transitory computer readable medium of claim 15, wherein the first repeating preamble pattern further comprises:
  a third data signal that contains all logical zeros; and
  wherein the second repeating preamble pattern further comprises:
  a fourth data signal that contains all logical ones.

17. The non-transitory computer readable medium of claim 15, wherein the one or more instructions that cause the power meter to configure the first burst preamble include one or more instructions that cause the power meter to:
  control the first repeating preamble pattern with respect to a first data bit pattern, a first length, and a first repeat count, and
  wherein the one or more instructions that cause the power meter to configure the second burst preamble include one or more instructions that cause the power meter to:
  control the second repeating preamble pattern with respect to a second data bit pattern, a second length, and a second repeat count.

18. The non-transitory computer-readable medium of claim 17, wherein the first data bit pattern and the second data bit pattern correspond to a first section of alternating data bit values, and a second section of identical data bit values,
  wherein the first length and the second length correspond to 8 octets, and
  wherein the first repeat count and the second repeat count correspond to 255.

19. The non-transitory computer readable medium of claim 15, wherein the one or more instructions further cause the power meter to:
  calculate, based on a mathematical relationship between the first optical power level and the second optical power level, an extinction ratio (ER) for the optical transmitter; and
  validate, based on the first optical power level, the second optical power level, and the ER, a compliance level associated with the optical transmitter with respect to specifications of the optical network.

20. The non-transitory computer readable medium of claim 15, wherein the one or more instructions further cause the power meter to:
  calculate, based on a mathematical relationship between the first optical power level and the second optical power level, an optical modulation amplitude (OMA) for the optical transmitter; and
  validate, based on the first optical power level, the second optical power level, and the OMA, a compliance level associated with the optical transmitter with respect to specifications of the optical network.

* * * * *